United States Patent
LeMay

(10) Patent No.: US 10,628,613 B2
(45) Date of Patent: *Apr. 21, 2020

(54) CRYPTOGRAPHIC OPERATIONS FOR SECURE PAGE MAPPING IN A VIRTUAL MACHINE ENVIRONMENT

(71) Applicant: Intel Corporation, Santa Clara, CA (US)

(72) Inventor: Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,944

(22) Filed: Nov. 9, 2018

(65) Prior Publication Data

US 2019/0095649 A1    Mar. 28, 2019

Related U.S. Application Data

(63) Continuation of application No. 14/866,211, filed on Sep. 25, 2015, now Pat. No. 10,152,612.

(51) Int. Cl.
| | | |
|---|---|---|
| *H04L 9/32* | (2006.01) | |
| *G06F 9/455* | (2018.01) | |
| *G06F 21/72* | (2013.01) | |
| *G06F 21/79* | (2013.01) | |

(52) U.S. Cl.
CPC .......... *G06F 21/72* (2013.01); *G06F 9/45533* (2013.01); *G06F 9/45558* (2013.01); *G06F 21/79* (2013.01); *H04L 9/3234* (2013.01); *H04L 9/3242* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 7,562,205 B1* | 7/2009 | Case | ................... | G06F 12/1036 711/209 |
| 8,839,450 B2* | 9/2014 | Durham | .............. | G06F 12/1408 713/193 |
| 2008/0005447 A1* | 1/2008 | Schoenberg | ........ | G06F 12/1036 711/6 |

\* cited by examiner

*Primary Examiner* — J. Brant Murphy
*Assistant Examiner* — Hassan Saadoun
(74) *Attorney, Agent, or Firm* — Grossman, Tucker, Perreault & Pfleger, PLLC

(57) ABSTRACT

Generally, this disclosure provides systems, devices, methods and computer readable media for secure memory page mapping in a virtual machine (VM) environment. The system may include a processor configured to execute a virtual machine monitor (VMM). The VMM may be configured to maintain a table of cryptographic keys and associate a token with one of the memory pages to be mapped from a guest linear address (GLA) to a guest physical address (GPA). The token may include a key identifier (key ID) associated with one of the cryptographic keys, and an authentication code based on the GLA, the GPA, and one of the cryptographic keys. The system may also include a page walk processor configured to validate the token to indicate that the memory page associated with the token is authorized to be mapped from the GLA to the GPA.

21 Claims, 7 Drawing Sheets

CRYPTOGRAPHIC OPERATIONS FOR SECURE PAGE MAPPING IN A VIRTUAL MACHINE ENVIRONMENT

FIELD

The present disclosure relates to page mapping in a virtual machine (VM) environment, and more particularly, to cryptographic operations for secure memory page mapping in a VM environment.

BACKGROUND

In a virtual machine (VM) environment, one or more VM guests are hosted on a platform and may operate using multiple memory views. A memory view is a domain within a shared address space that is associated with a certain level of protection, privilege and/or security. A virtual machine monitor (VMM) may manage the guest software and operating systems and control view switching between the various software entities. This view switching may typically be accomplished by the VMM through management and updating of paging structures (e.g., page tables and extended page tables) that are configured to map or translate guest linear memory addresses to guest physical memory addresses, and ultimately to host physical memory addresses.

Security-critical software components at all privilege levels within a virtual guest generally depend on correct guest linear to guest physical address mappings. Some systems (e.g., legacy software) may allow untrusted software to modify page tables that affect those mappings. There is a need to support such legacy software while still enforcing controls on linear to physical mappings in order to provide a desired level of security.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for cryptographic based secure memory page mapping in a virtual machine (VM) environment. In some embodiments, the system may include a processor configured to execute a virtual machine monitor (VMM) or hypervisor to manage the guest software and operating systems of the VM environment. The system may also include a page walk processor configured to perform mapping of memory pages, for example on behalf of VM guests, involving the associated transformation of guest linear addresses (GLAs) to guest physical addresses (GPAs). The VMM may be configured to insert a cryptographic token at a predefined location in each physical page to indicate that the page is authorized to be mapped into a specific linear address region. The page walk processor may be configured to validate that token prior to performing the mapping. The token may include an index to one of a number of cryptographic keys maintained by the VMM, which are used in combination with an encryption-based or hashing-based algorithm to generate a message authentication code (hereinafter also interchangeably referred to as an "authentication code") from information associated with the particular GLA to GPA mapping. The token may also include an authentication code which the page walk processor may use to validate the token against the encrypted information prior to performing the page mapping. The cryptographic keys are secured to allow access by only the VMM and the page walk processor to prevent token forgery by a VM guest.

It will be appreciated that control of address mapping, as described herein, may provide protection against a variety of security attacks. For example, remapping attacks could compromise software at any privilege level by reordering code pages so that branches land on unintended instructions and result in unauthorized control flows. Remapping attacks could also modify the selection of data pages for use, which may cause incorrect software behavior due to the use of unauthorized data as the value of a control variable or the use of an unauthorized destination location for sensitive/confidential data that might then be accessible to unauthorized entities.

Figure 1:
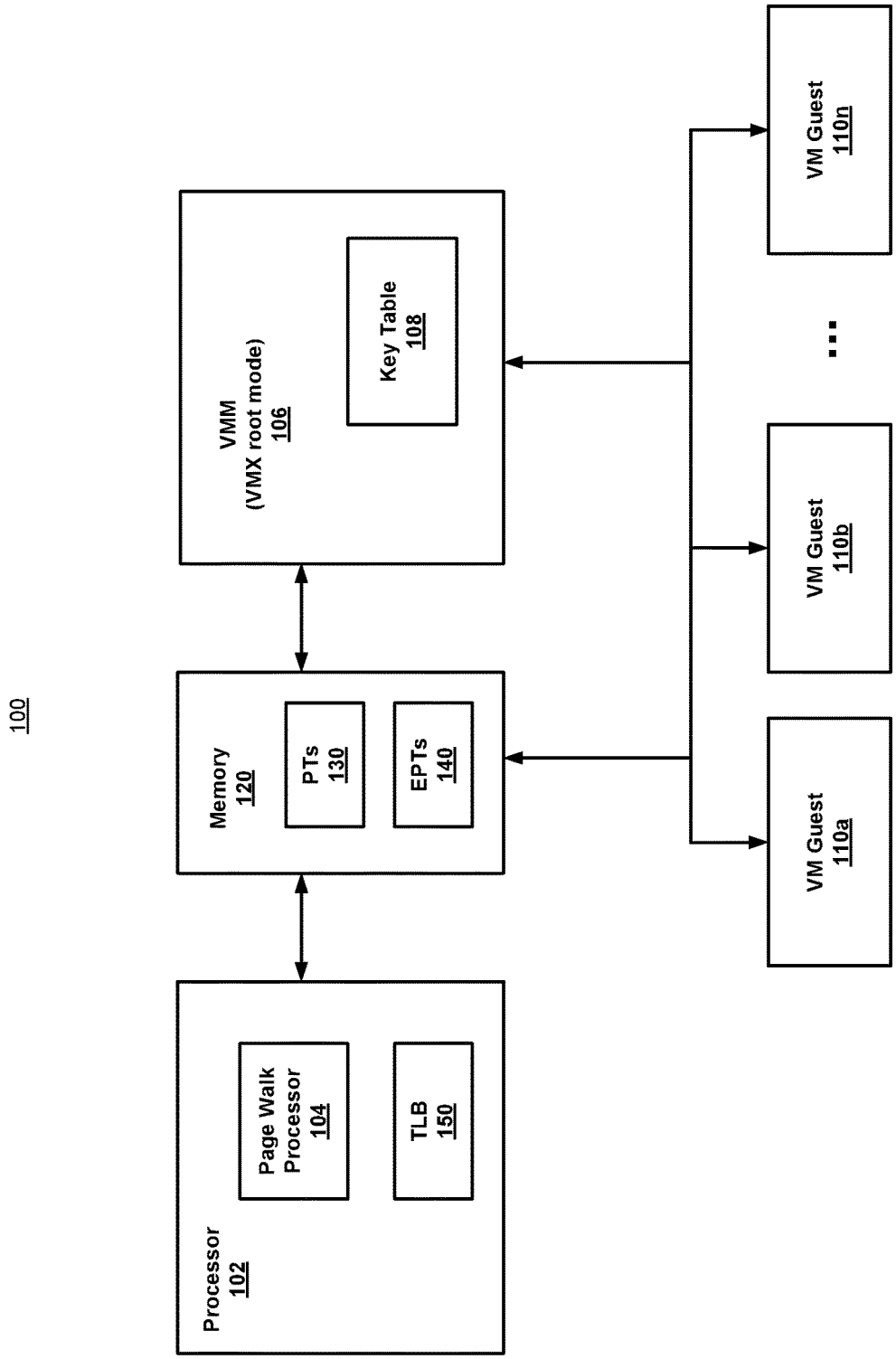
FIG. 1 illustrates a top level system diagram of an example embodiment consistent with the present disclosure.

FIG. 1 illustrates a top level system diagram 100 of one example embodiment consistent with the present disclosure. The system 100 may be a hardware platform or computing device such as, for example, a desktop computer, server, smart phone, notebook or laptop computer, or any other device whether fixed or mobile. The system 100 is shown to include a processor 102. In some embodiments, processor 102 may be implemented as any number of CPUs or processor cores. System 100 is also shown to include a memory module 120 coupled to the processor 102. The memory 120 may be any of a wide variety of memories (including various layers of memory hierarchy and/or memory caches) as are known or otherwise available to those of skill in the art. In some embodiments, page tables 130 and extended page tables 140 (or other types of paging structures) may be stored in memory 120 and configured to facilitate the mapping or translation of GLAs to GPAs.

The processor 102 may be a host processor for a VM environment and memory 120 may be configured as host physical memory to be protected from direct access by VM guests 110a, 110b, ... 110n. Host processor 102 is shown to include a page walk processor 104 (also referred to as a page handling processor or page miss handler). Page walk processor 104 may be an additional processor or sub-processor of any type, as previously described, configured to interpret and walk through page table structures, as will be described in greater detail below. Processor 102 is shown to also include translation look-aside buffers (TLBs) 150 configured to cache page table mappings for linear to physical address translations.

Processor 102 may also host or execute VMM 106 (also referred to as a hypervisor) which is configured to provide management and/or hosting of one or more VM guests 110a, 110b, . . . 110n. VMM 106 generally executes in a relatively higher privileged mode (e.g., VMX root mode or the like) associated with processor 102. VM guests 110 generally execute in modes of lower privilege (e.g., VMX non-root mode) which may include, for example, ring 0 (or supervisor) mode and ring 3 (or user) mode. Ring 0 privilege mode is a reduced privilege mode relative to VMX root mode (i.e., the privilege mode associated with the VMM) and ring 3 privilege mode is yet a further reduced privilege mode relative to ring 0 mode.

Although VM guests may share the same host physical memory 120, the VMM protects the physical memory through PT and EPT based mappings between guest physical memory addresses and host physical memory addresses. The VMM is also shown to include a key table 108 configured to store cryptographic keys that are created, maintained and destroyed by the VMM. Links to these keys, for example in the form of key IDs, may be inserted in tokens, also created by the VMM. The tokens are associated with memory pages for which authorization is to be required prior to mapping by the page walk processor 104, as will be explained in greater detail below.

As mentioned previously, some embodiments may employ multiple processors 102 or processor cores, each with its own dedicated or partially or completely shared page walk processor 104 and set of TLBs 150 that share a common memory 120 including PTs 130 and EPTs 140.

Figure 2:
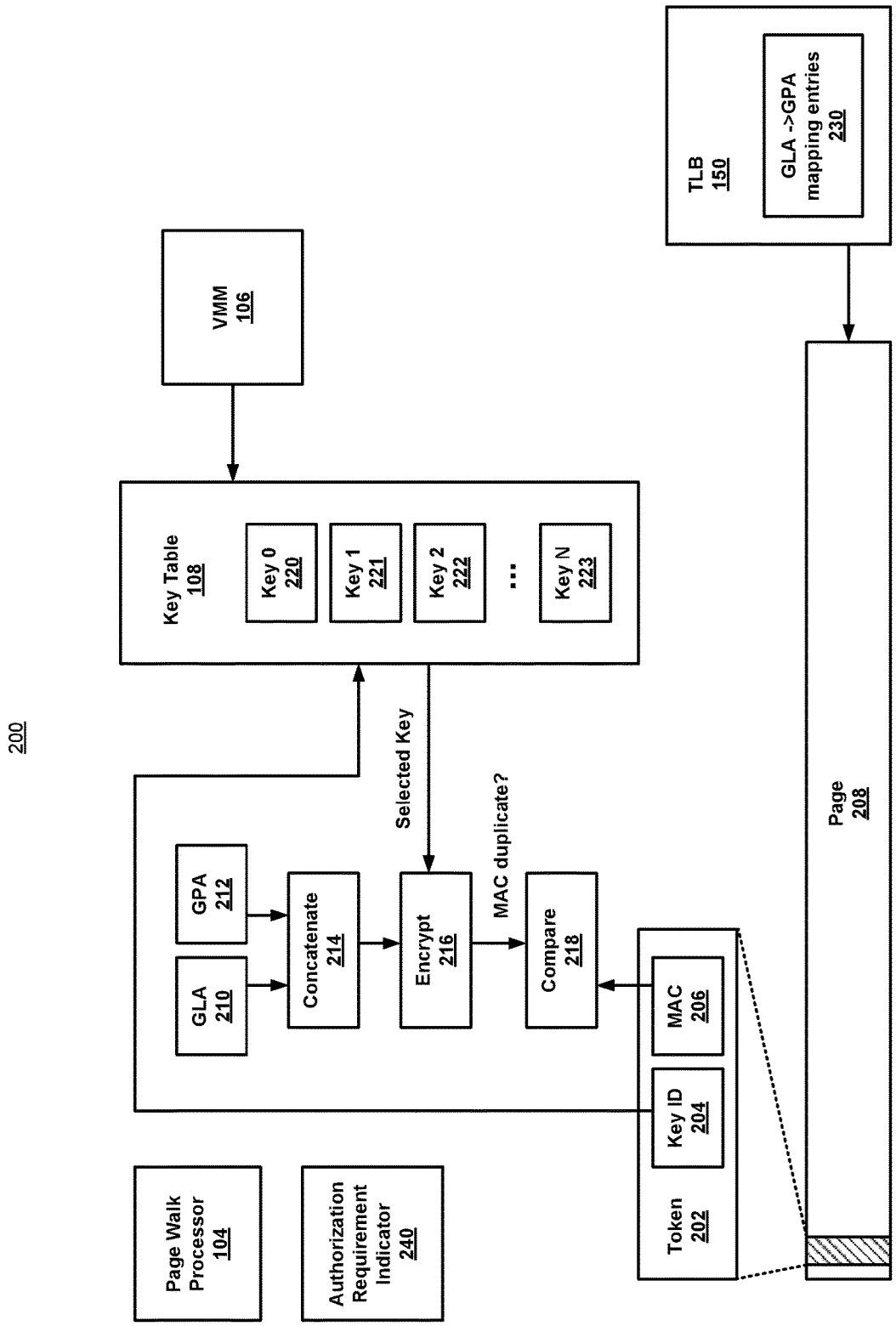
FIG. 2 illustrates a block diagram of one example embodiment consistent with the present disclosure.

FIG. 2 illustrates a block diagram 200 of one example embodiment consistent with the present disclosure. Interactions between the VMM 106, page walk processor 104, and TLB 150, for purposes of secure memory page mapping, are illustrated.

The VMM 106 may be configured to maintain a table or list of cryptographic keys 108. Each entry in the table, key 0 220 . . . key N 223, may be indexed by an associated key ID. The confidentiality of the keys is maintained so that only the VMM 106 and the page walk processor 104 are able to access the keys in order to prevent VM guests 110 from forging tokens. New keys may be created and old keys may be deleted or invalidated as needed, for example, as page mappings go in and out of use.

VMM 106 may also maintain an authorization requirement indicator 240 to indicate GLAs or ranges of GLAs for which authorization is to be required prior to mapping of the associated memory page to a GPA by the page walk processor 104. In some embodiments, the authorization requirement indicator 240 may employ a bitmap or other suitable data structure, including hierarchical arrangements of bitmaps, or a bloom filter, as will be described in greater detail below. Similar structures can be used to indicate GPAs or ranges of GPAs for which authorization is to be required prior to mapping of the associated memory page from a GLA by the page walk processor 104. GLA- and GPA-based authorization structures can be alternatives to each other or they can be used together.

For memory pages that are to require pre-mapping authorization, the VMM may be configured to create a token 202, that includes a key ID 204 and an authentication code 206 (also referred to as a message authentication code or MAC). The VMM generates the authentication code (or MAC) by encrypting a combination of a GLA and a GPA using one of the encryption keys from table 108. In some embodiments, the combination of GLA and GPA may be a concatenation of the two values. The token's key ID 204 indexes, or otherwise points to, the encryption key from key table 108 that was used to create the authentication code. The token 202 is then associated with the memory page 208 to be mapped using that GLA and GPA combination. In some embodiments, this association may be accomplished by embedding the token 202 in the memory page 208, for example at the beginning or at some other predefined location within the page. Alternatively the token may be stored within a VMM managed memory cache (not shown) with some level of associativity that is indexed by the GLA or GPA. This later approach would have the advantage of not disrupting the layout of the memory page which could otherwise impact compatibility with legacy applications.

The TLB 150 may be configured to store a number of entries 230 that provide GLA to GPA (and/or Host Physical Address) mappings for use by the page walk processor 104. It will be understood that use of the term GPA herein may also refer interchangeably to Host Physical Addresses (HPAs), and that in some embodiments, TLBs may map directly from GLAs to HPAs. Each entry 230 may be associated with the translation of addresses within some GLA region to a GPA (and/or HPA) region of the same size, and to check the permissions of the software attempting to access the region (e.g., read, write, execute permissions, etc.).

The page walk processor 104 may be configured to read mapping data from page tables (e.g., 130, 140), or other sources, indicating a request that a memory page 208 be loaded and mapped from a GLA 210 to a GPA 212. Page walk processor 104 may verify, through authorization requirement indicator 240, that the specified GLA 210 falls within a range of GLAs that require VMM authorization prior to mapping. In such case, page walk processor 104 may retrieve the token 202 associated with that memory page 208 and extract the key ID 204 and MAC 206. The key ID 204 is used as an index to obtain the encryption key (e.g., one of 220 to 223) that was used by the VMM to generate the MAC 206.

The page walk processor 104 may combine the GLA 210 and GPA 212, for example using concatenation circuit 214, and encrypt the combination based on the selected encryption key indexed by key ID 204, using encryption circuit 216. The resulting encrypted combination should be a duplicate version of the MAC 206 if the token is valid. Comparison circuit 218 may be configured to validate the token 202, and thus the mapping operation, if the encrypted combination matches the MAC 206.

In some embodiments, additional metadata beyond the GLA 210 and GPA 212 may be incorporated as input to the concatenation circuit 214 to permit more precise policies to be defined. Any subset of information that is stored in page table fields used by the page walk processor and any other information that is available to the page walk processor during the page walk could be incorporated. Examples of such information include the size of the page mapping and access permissions.

In some embodiments, any or all of concatenation circuit 214, encryption circuit 216 and comparison circuit 218 may be implemented as integrated components of page walk processor 104 or as independent circuitry.

Figure 3:
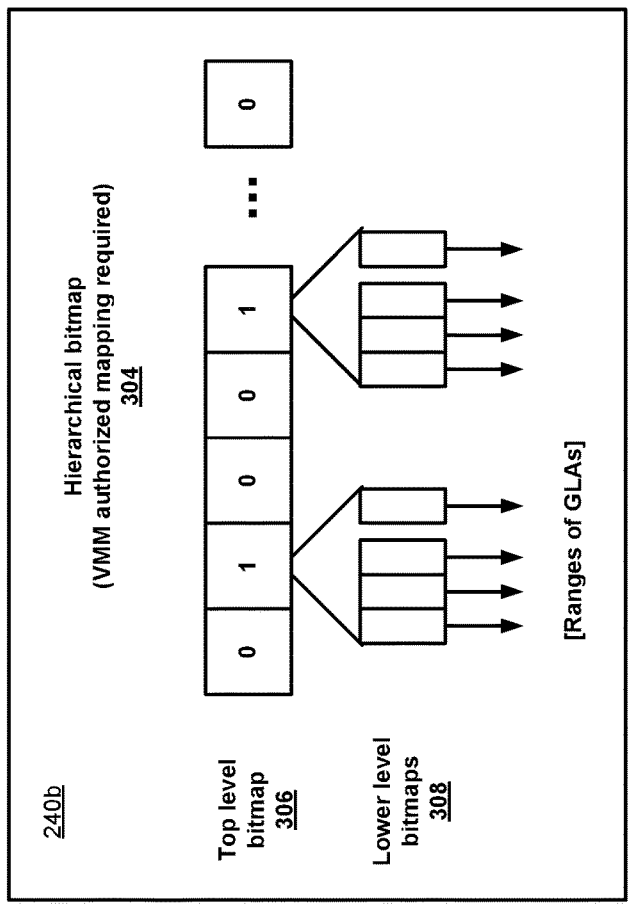
FIG. 3 illustrates bitmap layouts for indication of mapping authorization requirements consistent with one example embodiment of the present disclosure.
Figure 3:
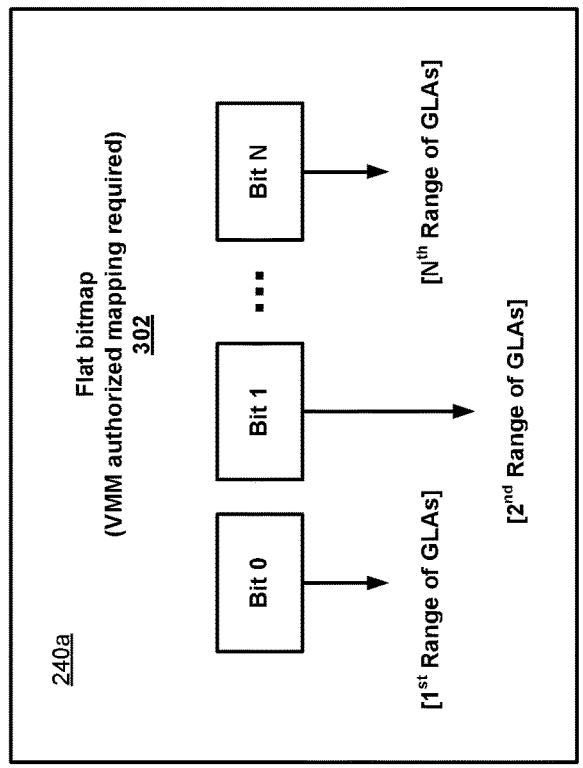

FIG. 3 illustrates bitmap layouts 300 for indication of mapping authorization requirements, consistent with one example embodiment of the present disclosure. One embodiment 240a of authorization requirement indicator 240 is shown as a flat bitmap structure 302 where each bit serves to indicate whether or not a given range of GLAs require VMM authorization, as described herein, prior to mapping. For example, a one may indicate that authorization is required while a zero may indicate that authorization is not required. Each bit may correspond to a minimally-sized, page-aligned linear address region (e.g., 4 Kbytes)

Another embodiment 240b of authorization requirement indicator 240 is shown as a hierarchical bitmap structure 304 where one or more bits of a top level bitmap 306 may be associated with one or more lower level bitmaps 308, each of which in turn may function in a manner similar to the flat bitmap 302 described previously. Such an arrangement may conserve space by eliminating empty portions of the bitmap (filled with zero entries) that need not link to lower level bitmaps 308.

Figure 4:
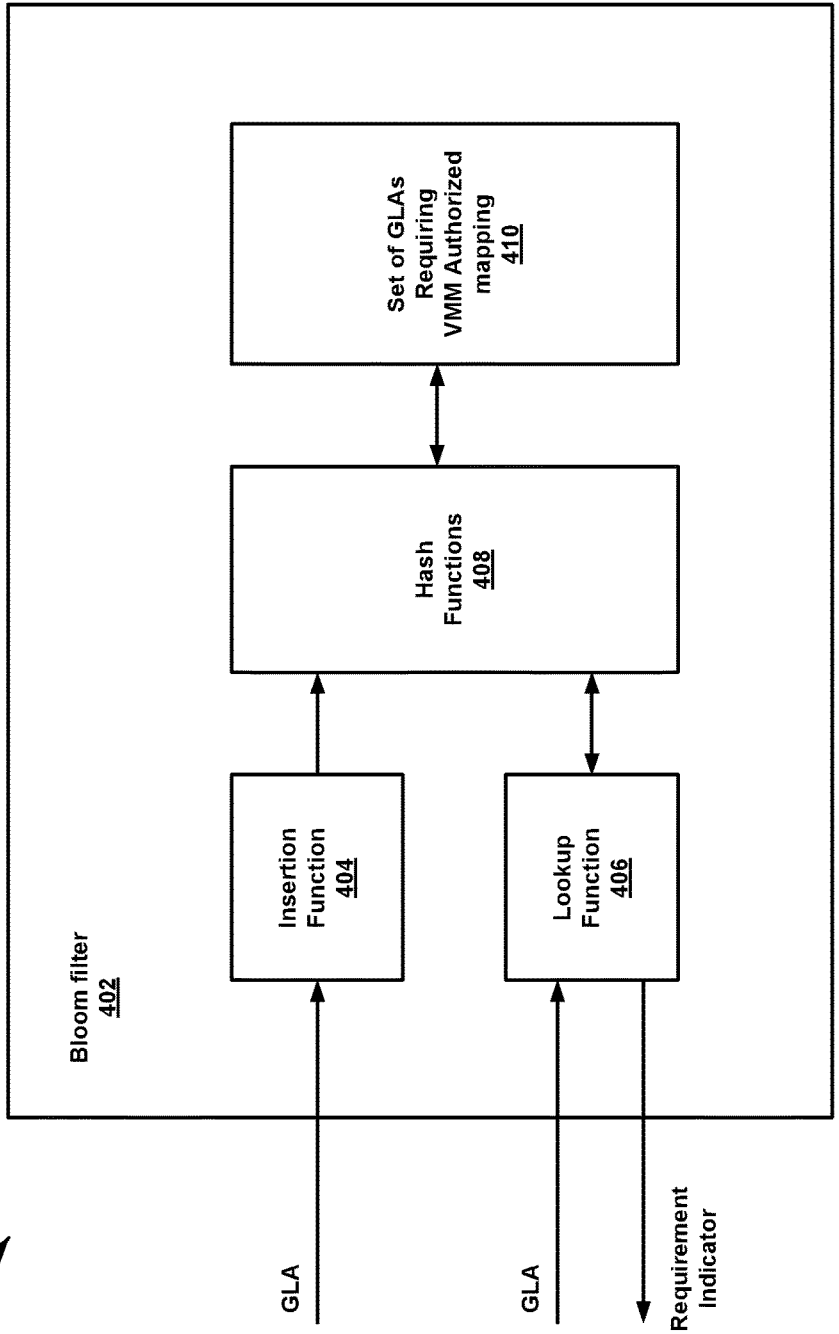
FIG. 4 illustrates a bloom filter block diagram for indication of mapping authorization requirements consistent with another example embodiment of the present disclosure.

FIG. 4 illustrates a bloom filter block diagram 400 for indication of mapping authorization requirements, consistent with another example embodiment of the present disclosure. This provides yet another embodiment 240c for authorization requirement indicator 240. The bloom filter 402 may be configured to maintain a set of GLAs 410 that require VMM authorization prior to mapping. The bloom filter may be implemented in any of a number of ways, as known in the art. For example, an insertion function or circuit 404 may be provided to add new GLAs to the set 410 and a lookup function or circuit 406 may be provided to determine whether a particular GLA is present in the set 410. Hash function 408 (which may include multiple hash functions) may be configured to translate GLA addresses into vectors that index the set 410. For example, the system may start with a list of $2^{m \cdot N}$ bits, all of which are initialized to 0. A GLA address (A) is provided, for insertion, to each of the hash function which each output a number between 0 and $2^{m \cdot N}-1$. Each of these numbers is used as an index into the list, and the bit at that index is set to a 1. When a second GLA address (B) is provided for lookup, that address is fed into the same hash functions that were used during insertion. A check is performed as to whether all of the bits in the list at the indices corresponding to the outputs from the hash functions are set to 1. If so, address B may have been previously inserted into the set. It is possible however, that address B was NOT previously inserted into the set, resulting in a false positive. The relevant bits may have happened to be set due to other address insertions.

The bloom filter offers the advantage of conserving memory, by more compactly encoding which addresses need to use authorized mappings, compared to the bitmap approach. A drawback, however, due to the use of hash functions, is that the bloom filter may result in false positives (i.e., falsely reporting that a GLA is in the set 410). False negatives, on the other hand, are not possible (i.e., a GLA that was inserted into the set 410 will always be detected).

Figure 5:
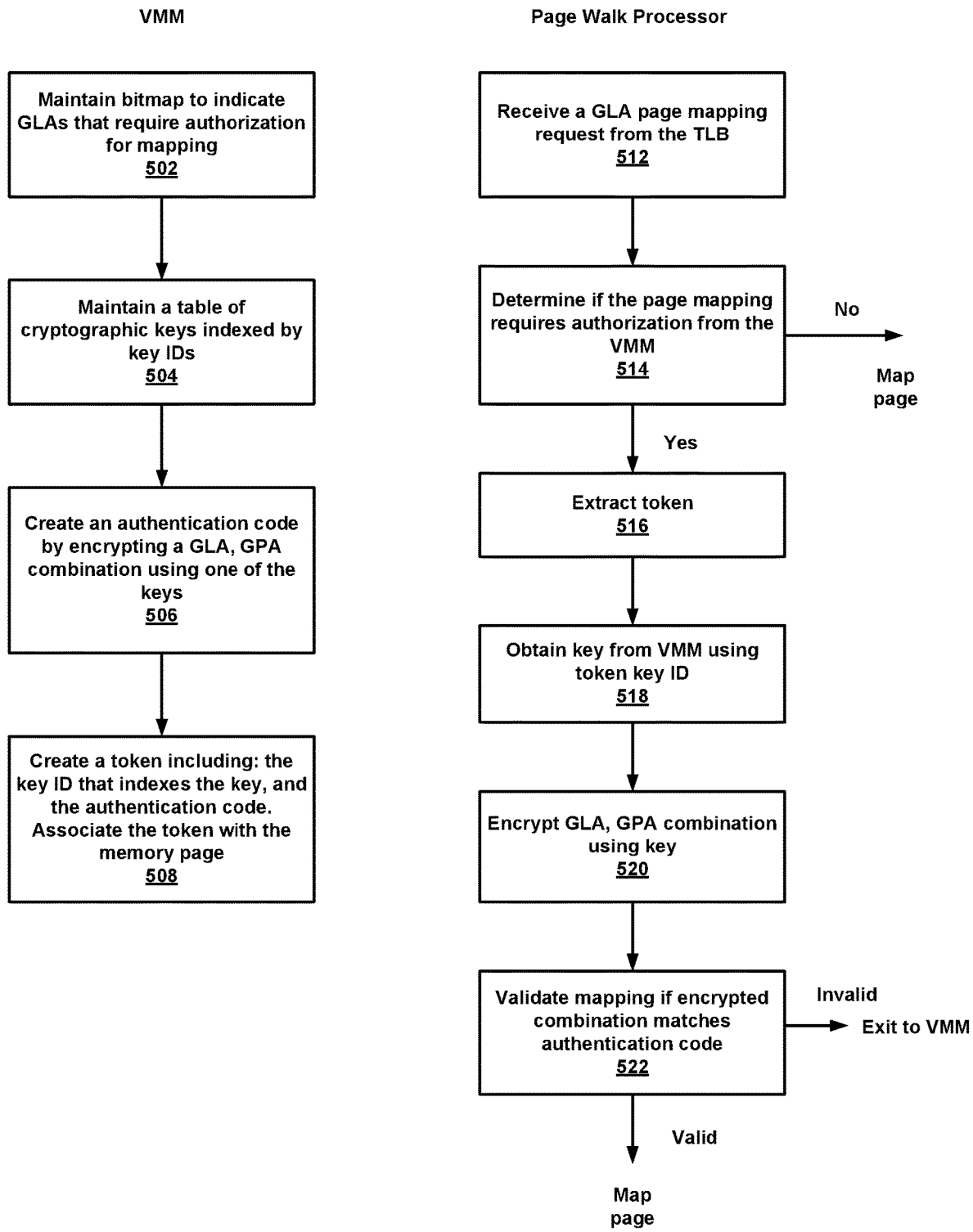
FIG. 5 illustrates a flowchart of operations of another example embodiment consistent with the present disclosure.

FIG. 5 illustrates a flowchart of operations 500 of another example embodiment consistent with the present disclosure. The operations provide a method for secure memory page mapping in a VM environment. Operations 502 through 508 may be performed, in some embodiments, by VMM 106, while operations 512 through 522 may be performed by page walk processor 104, although in general other combinations of hardware, firmware or software may be used.

At operation 502, the VMM maintains a bitmap or other data structure to indicate GLAs or ranges of GLAs for which authorization is to be required prior to mapping of the associated memory page to a GLA. In some embodiments, as previously discussed, other suitable mechanisms may be used for this purpose including hierarchical arrangements of bitmaps or bloom filters.

At operation 504, the VMM maintains a table of cryptographic keys, each indexed by a key ID. New keys may be created and old keys may be deleted or invalidated as needed. The confidentiality of the keys is maintained so that only the VMM and the page walk processor are able to access them in order to prevent VM guests from forging tokens.

At operation 506, the VMM creates an authentication code (or MAC) by encrypting a combination of a GLA and a GPA using one of the encryption keys. In some embodiments, the combination of GLA and GPA may be a concatenation of the two values. At operation 508, the VMM creates a token that includes the authentication code and the key ID that indexes the encryption key used to create the authentication code. The token is then associated with the memory page to be mapped using that GLA and GPA combination. In some embodiments, this association may be accomplished by embedding the token in the memory page, for example at the beginning or at some other predefined location within the page. Alternatively the token may be stored within a VMM managed memory cache with some level of associativity that is indexed by the GLA or GPA to avoid disrupting the layout of the memory page which could impact compatibility with legacy applications.

At operation 512, the page walk processor receives an indication, for example from page tables or extended page tables, of a request that a memory page be loaded and mapped from a given GLA to GPA. At operation 514, the page walk processor determines if that page mapping requires authorization from the VMM. In some embodiments, this may be accomplished by checking the VMM bitmap or through application of the bloom filter to the GLA. If authorization is not required the page may be mapped. Otherwise, at operation 516, the token associated with that page is extracted from the page or obtained through other suitable means.

At operation 518, the key ID is obtained from the token and used as an index to obtain the encryption key from the VMM key table. At operation 520, the page walk processor encrypts the GLA and GPA combination using the encryption key. This encrypted value is then compared, at operation 522, to the authentication code of the token, and if they match, the mapping is validated or authorized and thus may proceed.

If the token is invalid, then a VM exit or other type of control flow transfer or mode switch may be generated to invoke the VMM or an authorized guest software agent of the VMM if one exists (both of which are hereafter referred to interchangeably as the VMM). The VMM can respond appropriately based on the applicable security policy. For example, the VMM may terminate the VM. Another example is that the VMM may determine that the mapping is authorized and install a valid token in the affected page prior to resuming the execution of the VM.

If a bloom filter is in use to determine which mappings need to be validated, then the token may be invalid due to the bloom filter generating a false positive indication and arbitrary data on the affected page being treated as a token. The VMM may respond to such a false positive event by directly inserting the mapping into the TLB if the TLB can be directly modified by software, or the VMM may indicate to the page walk processor that the mapping should be permitted even though there is not a valid token on the page. Such an indication could be communicated from the VMM to the page walk processor in a variety of ways, such as via a field in a virtual machine control structure or a model-specific register indicating that after the execution of the VM has been resumed token validation should be skipped for the next page walk, or that token validation should be skipped for a page walk for a particular GLA or a page walk that maps to a particular GPA.

However, such indications should be made in accordance with the applicable security policy. For example, indicating that token validation should be skipped for page walks that map to a particular GPA may create a potential for mappings from GLAs other than the one that induced the invalid token indication. One possible mechanism to limit that possibility would be for the processor to clear out the indication after a single use.

The use of a single token may prevent aliasing of a physical page from multiple linear addresses, which may be desirable in some instances. Mapping possibilities may be further reduced, in some embodiments, by incorporating additional information related to a particular process or view into the authentication code generation.

Alternatively, some aliasing may be desired to support memory sharing. In some embodiments, this may be supported by storing tokens in a VMM-managed cache that could be cleared during context (e.g., view or process) switches and only populated with mappings that are allowed in a current context. Multiple mappings for a single physical page could be allowed. In yet another embodiment, multiple tokens could be supported at different predefined locations on each physical page.

In some embodiments, a master enable bit may be incorporated in any suitable register (e.g., where space is available) to control whether token validation is performed. That is to say, the enable bit may be configured to selectively enable or disable the token validation process.

Figure 6:
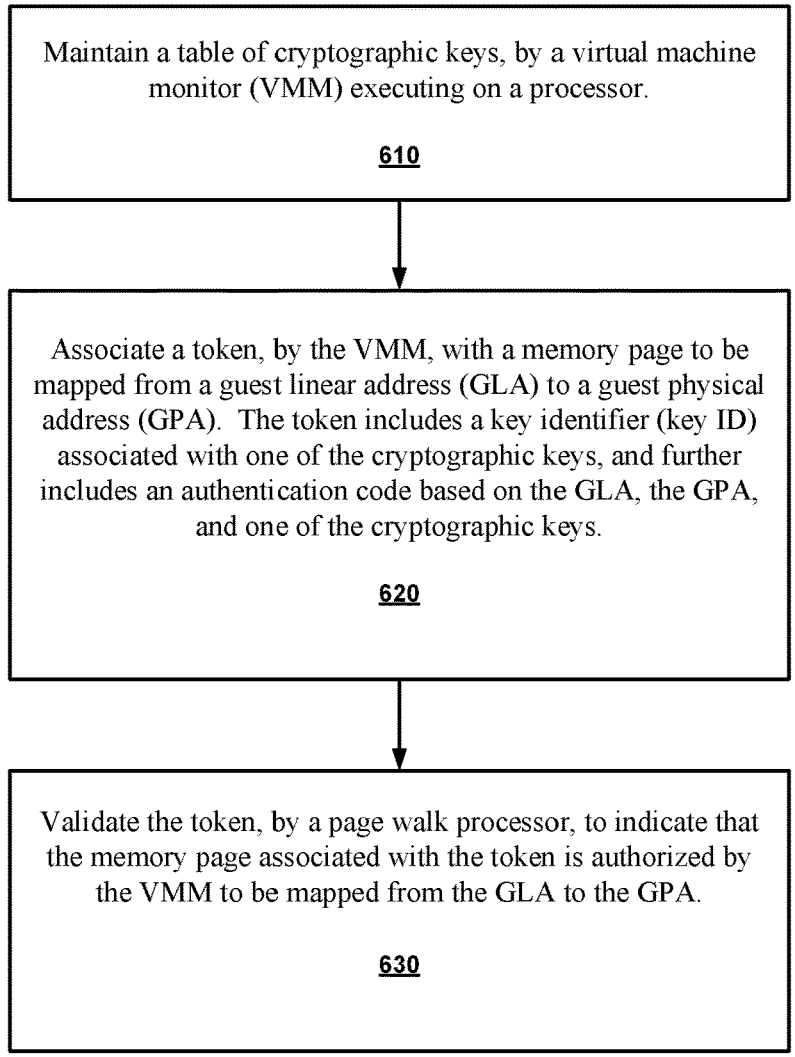
FIG. 6 illustrates a flowchart of operations of another example embodiment consistent with the present disclosure.

FIG. 6 illustrates a flowchart of operations 600 of another example embodiment consistent with the present disclosure. The operations provide a method for secure memory page mapping in a VM environment. At operation 610, a table of cryptographic keys is maintained by a VMM executing on a processor. At operation 620, a token is associated, by the VMM, with one of the memory pages to be mapped from a GLA to a GPA. The token includes a key identifier (key ID) associated with one of the cryptographic keys, and an authentication code based on the GLA, the GPA, and one of the cryptographic keys. At operation 630, the token is validated by a page walk processor to indicate that the memory page associated with the token is authorized by the VMM to be mapped from the GLA to the GPA.

Figure 7:
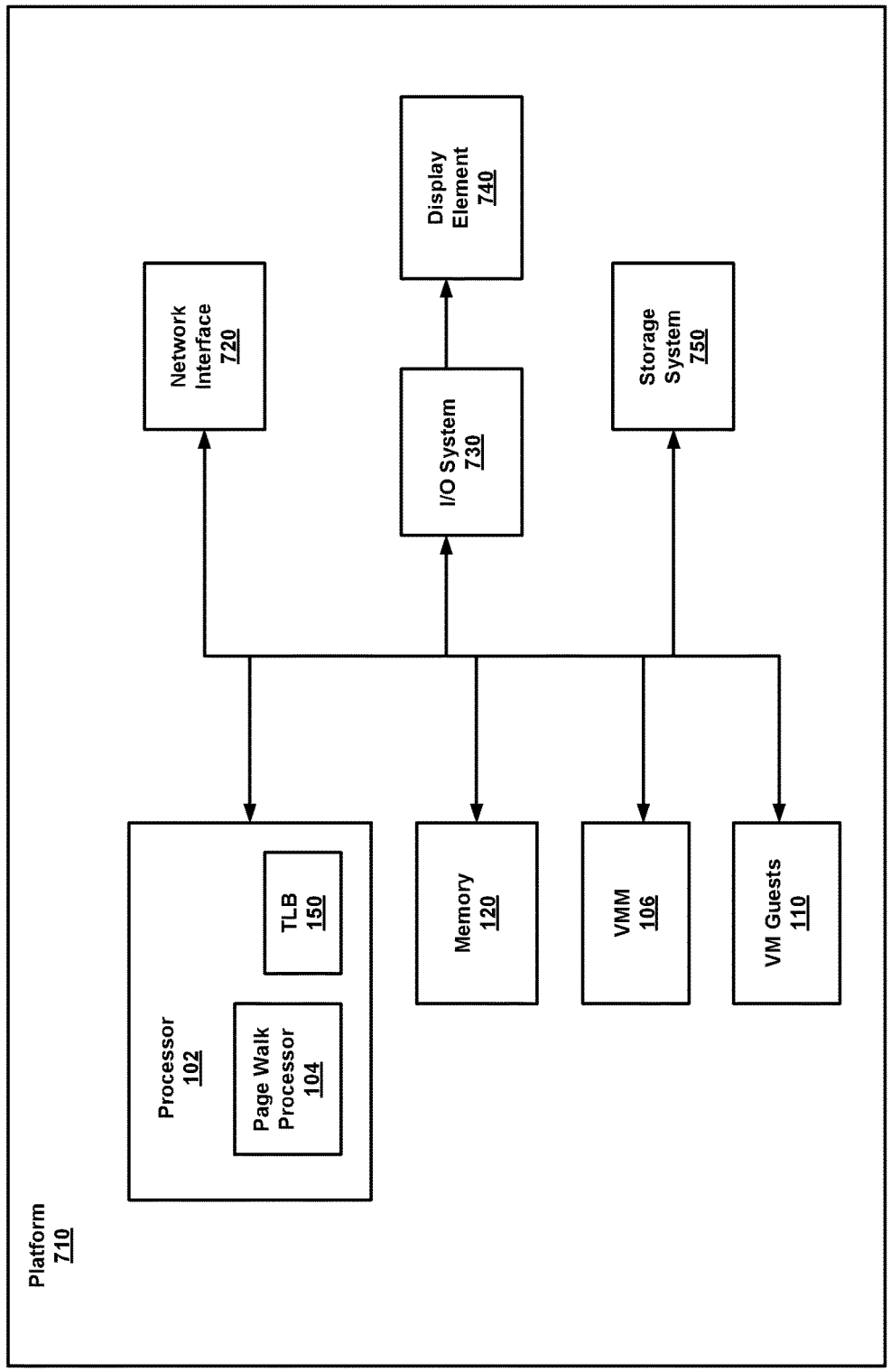
FIG. 7 illustrates a system diagram of a platform of another example embodiment consistent with the present disclosure.

FIG. 7 illustrates a system diagram 700 of one example embodiment consistent with the present disclosure. The system 700 may be a platform 710 hosting a communication and/or computing device such as, for example, a workstation or desktop computer, a notebook or laptop computer, a smart phone, smart tablet, personal digital assistant (PDA), mobile Internet device (MID) or convertible tablet.

The system 700 is shown to include one or more processors 102 and memory 120 which may be configured to provide a VM environment as described previously. In some embodiments, the processors 102 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multi-threaded cores in that they may include more than one hardware thread context (or "logical processor") per core. The memory 120 may be coupled to the processors. The memory 120 may be any of a wide variety of memories (including various layers of memory hierarchy and/or memory caches) as are known or otherwise available to those of skill in the art. It will be appreciated that the processors and memory may be configured to store, host and/or execute one or more operating systems, user applications or other software. The applications may include, but not be limited to, for example, any type of computation, communication, data management, data storage and/or user interface task. In some embodiments, these applications may employ or interact with any other components of the platform 710. The processors and memory may be configured to host and/or execute a VMM 106 and one or more VM guests 110 as previously described.

System 700 is also shown to include a page walk processor 104 and TLBs 150, which in some embodiments may be integrated with processor 102, and configured to support the VM environment and secure memory page mapping as previously described.

System 700 is also shown to include network interface circuit 720 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

System 700 is also shown to include an input/output (IO) system or controller 730 which may be configured to enable or manage data communication between processor 102 and other elements of system 700 or other elements (not shown) external to system 700. The system may generally present various interfaces to a user via a display element 740 such as, for example, a touch screen, liquid crystal display (LCD) or any other suitable display type. System 700 is also shown to include a storage system 750, for example a hard disk drive (HDD) or solid state drive (SSD), coupled to the processor 102.

It will be appreciated that in some embodiments, the various components of the system 700 may be combined in a system-on-a-chip (SoC) architecture. In some embodiments, the components may be hardware components, firmware components, software components or any suitable combination of hardware, firmware or software.

"Circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices, methods and computer readable media for secure memory page mapping in a VM environment. The following examples pertain to further embodiments.

According to Example 1 there is provided a system for secure memory page mapping in a virtual machine (VM) environment. The system may include a processor to execute a virtual machine monitor (VMM) to: maintain a table of cryptographic keys; and associate a token with one of the memory pages to be mapped from a guest linear address (GLA) to a guest physical address (GPA), the token including a key identifier (key ID) associated with one of the cryptographic keys, and further including an authentication code based on the GLA, the GPA, and one of the cryptographic keys; and a page walk processor to validate the token to indicate that the memory page associated with the token is authorized to be mapped from the GLA to the GPA.

Example 2 may include the subject matter of Example 1, and the VMM is further to generate the authentication code through encryption of a combination of the GLA and the GPA using one of the cryptographic keys.

Example 3 may include the subject matter of Examples 1 and 2, and the page walk processor token validation includes: extracting the key ID and the authentication code from the token; obtaining one of the keys from the table, based on the extracted key ID; encrypting a combination of the GLA and the GPA using the key; comparing the encrypted combination to the extracted authentication code; and allowing the mapping if the encrypted combination matches the extracted authentication code.

Example 4 may include the subject matter of Examples 1-3, and the VMM maintaining the table of cryptographic keys includes: creating new keys and associated key IDs for insertion into the table to validate new GLA to GPA mappings; and deleting existing keys and associated key IDs from the table to invalidate existing GLA to GPA mappings.

Example 5 may include the subject matter of Examples 1-4, and the VMM associating the token with one of the memory pages includes inserting the token at a predetermined location within the memory page.

Example 6 may include the subject matter of Examples 1-5, and the VMM associating the token with one of the memory pages includes storing the token in a memory cache managed by the VMM and indexed by the GLA or the GPA.

Example 7 may include the subject matter of Examples 1-6, and the VMM is further to maintain a bitmap including a plurality of entries, each of the entries corresponding to a range of GLAs and indicating that a GLA within the range of GLAs requires token authorization by the page walk processor prior to mapping to a GPA.

Example 8 may include the subject matter of Examples 1-7, and the VMM is further to maintain a bitmap including a plurality of entries, each of the entries corresponding to a range of GPAs and indicating that a GPA within the range of GPAs requires token authorization by the page walk processor prior to mapping from a GLA.

Example 9 may include the subject matter of Examples 1-8, and the VMM is further to implement a bloom filter to indicate that a GLA or a GPA requires token authorization by the page walk processor prior to mapping from the GLA to the GPA.

According to Example 10 there is provided a method for secure memory page mapping in a virtual machine (VM) environment. The method may include: maintaining a table of cryptographic keys, by a virtual machine monitor (VMM) executing on a processor; associating a token, by the VMM, with one of the memory pages to be mapped from a guest linear address (GLA) to a guest physical address (GPA), the token including a key identifier (key ID) associated with one of the cryptographic keys, and further including an authentication code based on the GLA, the GPA, and one of the cryptographic keys; and validating the token, by a page walk processor, to indicate that the memory page associated with the token is authorized to be mapped from the GLA to the GPA.

Example 11 may include the subject matter of Example 10, further including generating the authentication code through encryption of a combination of the GLA and the GPA using one of the cryptographic keys.

Example 12 may include the subject matter of Examples 10 and 11, further including: extracting the key ID and the authentication code from the token; obtaining one of the keys from the table, based on the extracted key ID; encrypting a combination of the GLA and the GPA using the key; comparing the encrypted combination to the extracted authentication code; and allowing the mapping if the encrypted combination matches the extracted authentication code.

Example 13 may include the subject matter of Examples 10-12, further including:

creating new keys and associated key IDs for insertion into the table to validate new GLA to GPA mappings; and deleting existing keys and associated key IDs from the table to invalidate existing GLA to GPA mappings.

Example 14 may include the subject matter of Examples 10-13, further including inserting the token at a predetermined location within the memory page.

Example 15 may include the subject matter of Examples 10-14, further including storing the token in a memory cache managed by the VMM and indexed by the GLA or the GPA.

Example 16 may include the subject matter of Examples 10-15, further including maintaining a bitmap including a plurality of entries, each of the entries corresponding to a range of GLAs and indicating that a GLA within the range of GLAs requires token authorization by the page walk processor prior to mapping to a GPA.

Example 17 may include the subject matter of Examples 10-16, further including maintaining a bitmap including a plurality of entries, each of the entries corresponding to a range of GPAs and indicating that a GPA within the range of GPAs requires token authorization by the page walk processor prior to mapping from a GLA.

Example 18 may include the subject matter of Examples 10-17, further including implementing a bloom filter to indicate that a GLA or a GPA requires token authorization by the page walk processor prior to mapping from the GLA to the GPA.

According to Example 19 there is provided at least one computer-readable storage medium having instructions stored thereon which when executed by a processor result in the following operations for secure memory page mapping in a virtual machine (VM) environment. The operations may include: maintaining a table of cryptographic keys, by a virtual machine monitor (VMM) executing on a processor; associating a token, by the VMM, with one of the memory pages to be mapped from a guest linear address (GLA) to a guest physical address (GPA), the token including a key identifier (key ID) associated with one of the cryptographic keys, and further including an authentication code based on the GLA, the GPA, and one of the cryptographic keys; and validating the token, by a page walk processor, to indicate that the memory page associated with the token is authorized to be mapped from the GLA to the GPA.

Example 20 may include the subject matter of Example 19, further including generating the authentication code through encryption of a combination of the GLA and the GPA using one of the cryptographic keys.

Example 21 may include the subject matter of Examples 19 and 20, further including: extracting the key ID and the authentication code from the token; obtaining one of the keys from the table, based on the extracted key ID; encrypting a combination of the GLA and the GPA using the key; comparing the encrypted combination to the extracted authentication code; and allowing the mapping if the encrypted combination matches the extracted authentication code.

Example 22 may include the subject matter of Examples 19-21, further including:
creating new keys and associated key IDs for insertion into the table to validate new GLA to GPA mappings; and deleting existing keys and associated key IDs from the table to invalidate existing GLA to GPA mappings.

Example 23 may include the subject matter of Examples 19-22, further including inserting the token at a predetermined location within the memory page.

Example 24 may include the subject matter of Examples 19-23, further including storing the token in a memory cache managed by the VMM and indexed by the GLA or the GPA.

Example 25 may include the subject matter of Examples 19-24, further including maintaining a bitmap including a plurality of entries, each of the entries corresponding to a range of GLAs and indicating that a GLA within the range of GLAs requires token authorization by the page walk processor prior to mapping to a GPA.

Example 26 may include the subject matter of Examples 19-25, further including maintaining a bitmap including a plurality of entries, each of the entries corresponding to a range of GPAs and indicating that a GPA within the range of GPAs requires token authorization by the page walk processor prior to mapping from a GLA.

Example 27 may include the subject matter of Examples 19-26, further including implementing a bloom filter to indicate that a GLA or a GPA requires token authorization by the page walk processor prior to mapping from the GLA to the GPA.

According to Example 28 there is provided a system for secure memory page mapping in a virtual machine (VM) environment. The system may include: means for maintaining a table of cryptographic keys, by a virtual machine monitor (VMM) executing on a processor; means for associating a token, by the VMM, with one of the memory pages to be mapped from a guest linear address (GLA) to a guest physical address (GPA), the token including a key identifier (key ID) associated with one of the cryptographic keys, and further including an authentication code based on the GLA, the GPA, and one of the cryptographic keys; and means for validating the token, by a page walk processor, to indicate that the memory page associated with the token is authorized to be mapped from the GLA to the GPA.

Example 29 may include the subject matter of Example 28, further including means for generating the authentication code through encryption of a combination of the GLA and the GPA using one of the cryptographic keys.

Example 30 may include the subject matter of Examples 28 and 29, further including: means for extracting the key ID and the authentication code from the token; means for obtaining one of the keys from the table, based on the extracted key ID; means for encrypting a combination of the GLA and the GPA using the key; means for comparing the encrypted combination to the extracted authentication code; and means for allowing the mapping if the encrypted combination matches the extracted authentication code.

Example 31 may include the subject matter of Examples 28-30, further including: means for creating new keys and associated key IDs for insertion into the table to validate new GLA to GPA mappings; and means for deleting existing keys and associated key IDs from the table to invalidate existing GLA to GPA mappings.

Example 32 may include the subject matter of Examples 28-31, further including means for inserting the token at a predetermined location within the memory page.

Example 33 may include the subject matter of Examples 28-32, further including means for storing the token in a memory cache managed by the VMM and indexed by the GLA or the GPA.

Example 34 may include the subject matter of Examples 28-33, further including means for maintaining a bitmap including a plurality of entries, each of the entries corresponding to a range of GLAs and indicating that a GLA within the range of GLAs requires token authorization by the page walk processor prior to mapping to a GPA.

Example 35 may include the subject matter of Examples 28-34, further including means for maintaining a bitmap including a plurality of entries, each of the entries corresponding to a range of GPAs and indicating that a GPA within the range of GPAs requires token authorization by the page walk processor prior to mapping from a GLA.

Example 36 may include the subject matter of Examples 28-35, further including means for implementing a bloom filter to indicate that a GLA or a GPA requires token authorization by the page walk processor prior to mapping from the GLA to the GPA.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for secure memory page mapping in a virtual machine (VM) environment, the system comprising:
   a processor to execute a virtual machine monitor (VMM), the VMM to:
      retrieve, from a table of cryptographic keys, a key identifier (key ID) that is associated with but distinct from a selected one of the cryptographic keys;
      generate an authentication code by using the selected cryptographic key to encrypt a combination of a guest linear address (GLA) and a guest physical address (GPA); and
      associate a token comprising the key ID and the authentication code with a memory page to be mapped from the GLA to the GPA; and
   a page walk processor to:
      validate the associated token to verify that the memory page is authorized to be mapped from the GLA to the GPA; and
      based at least in part on the validation, map the memory page to the GPA.

2. The system of claim 1, wherein to associate the token with the memory page comprises to insert the token at a predetermined location within the memory page.

3. The system of claim 1, wherein the VMM is further to maintain an indicator to indicate GLAs or ranges of GLAs prior to mapping of memory pages to a GPA by the page walk processor, and wherein the system further comprises a translation look-aside buffer (TLB) to store one or more indications of mappings for use by the page walk processor.

4. A method for secure memory page mapping in a virtual machine (VM) environment, the method comprising:
   retrieving, from a table of cryptographic keys, a key identifier (key ID) that is associated with but distinct from a selected one of the cryptographic keys;
   generating an authentication code by using the selected cryptographic key to encrypt a combination of a guest linear address (GLA) and a guest physical address (GPA);
   associating a token comprising the key ID and the authentication code with a memory page to be mapped from the GLA to the GPA; and
   based at least in part on validating the associated token to verify that the memory page is authorized to be mapped from the GLA to the GPA, mapping the memory page to the GPA.

5. The method of claim 4, wherein associating the token with the memory page includes inserting the token at a predetermined location within the memory page.

6. The method of claim 4, further comprising:
   maintaining an indicator to indicate GLAs or ranges of GLAs prior to mapping of one or more memory pages to one or more GPAs by a page walk processor; and
   storing, via a translation look-aside buffer (TLB), entries indicative of GLA to GPA mappings for use by the page walk processor.

7. The method of claim 4, further comprising:
   extracting the key ID and authentication code from the associated token;
   obtaining the selected key from the table based on the extracted key ID;
   encrypting a combination of the GLA and the GPA based on the selected key;
   comparing the encrypted combination to the extracted authentication code; and
   allowing the mapping responsive to determining that the encrypted combination matches the extracted authentication code.

8. The method of claim 4, further comprising:
   creating one or more new keys and associated key IDs for insertion into the table of cryptographic keys to validate new mappings; and
   deleting one or more existing keys and associated key IDs from the table to invalidate existing mappings.

9. The method of claim 4, further comprising storing the token in a memory cache managed by a virtual machine monitor (VMM) and indexed by at least one of a group that includes the GLA and/or the GPA.

10. The method of claim 4, further comprising maintaining a data structure comprising a plurality of entries that each correspond to a range of GLAs and indicate that a GLA within the range of GLAs requires token authorization prior to mapping to a GPA.

11. The method of claim 4, further comprising maintaining a data structure comprising a plurality of entries that each correspond to a range of GPAs and indicate that a GPA within the range of GPAs requires token authorization prior to mapping from a GLA.

12. The method of claim 4, further comprising using a bloom filter to indicate that a GLA or a GPA requires token authorization prior to mapping from the GLA to the GPA.

13. At least one non-transitory computer-readable storage medium having instructions stored thereon which when executed by a processor result in the following operations for secure memory page mapping in a virtual machine (VM) environment, the operations comprising:
   retrieving, from a table of cryptographic keys, a key identifier (key ID) that is associated with but distinct from a selected one of the cryptographic keys;
   generating an authentication code by using the selected cryptographic key to encrypt a combination of a guest linear address (GLA) and a guest physical address (GPA);
   associating a token comprising the key ID and the authentication code with a memory page to be mapped from the GLA to the GPA; and based at least in part on validating the associated token to verify that the memory page is authorized to be mapped from the GLA to the GPA, mapping the memory page to the GPA.

14. The at least one non-transitory computer-readable storage medium of claim 13, wherein associating the token with the memory page includes inserting the token at a predetermined location within the memory page.

15. The at least one non-transitory computer-readable storage medium of claim 13, wherein the operations further comprise:
   maintaining an indicator to indicate GLAs or ranges of GLAs prior to mapping of one or more memory pages to one or more GPAs; and
   storing, via a translation look-aside buffer (TLB), entries indicative of GLA to GPA mappings.

16. The at least one non-transitory computer-readable storage medium of claim 13, wherein the operations further comprise:
   extracting the key ID and authentication code from the associated token;
   obtaining the selected key from the table based on the extracted key ID;
   encrypting a combination of the GLA and the GPA based on the selected key;
   comparing the encrypted combination to the extracted authentication code; and
   allowing the mapping responsive to determining that the encrypted combination matches the extracted authentication code.

17. The at least one non-transitory computer-readable storage medium of claim 13, wherein the operations further comprise:
   creating one or more new keys and associated key IDs for insertion into the table of cryptographic keys to validate new mappings; and
   deleting one or more existing keys and associated key IDs from the table to invalidate existing mappings.

18. The at least one non-transitory computer-readable storage medium of claim 13, wherein the operations further comprise storing the token in a memory cache managed by a virtual machine monitor (VMM) and indexed by at least one of a group that includes the GLA and/or the GPA.

19. The at least one non-transitory computer-readable storage medium of claim 13, wherein the operations further comprise maintaining a data structure comprising a plurality of entries that each correspond to a range of GLAs and indicate that a GLA within the range of GLAs requires token authorization prior to mapping to a GPA.

20. The at least one non-transitory computer-readable storage medium of claim 13, wherein the operations further comprise maintaining a data structure comprising a plurality of entries that each correspond to a range of GPAs and indicate that a GPA within the range of GPAs requires token authorization prior to mapping from a GLA.

21. The at least one non-transitory computer-readable storage medium of claim 13, wherein the operations further comprise using a bloom filter to indicate that a GLA or a GPA requires token authorization prior to mapping from the GLA to the GPA.

* * * * *